US006760084B2

(12) United States Patent
Cole et al.

(10) Patent No.: US 6,760,084 B2
(45) Date of Patent: Jul. 6, 2004

(54) BACKLIT LABEL WITH ENHANCED "OFF"STATE APPEARANCE

(75) Inventors: James R Cole, Albany, OR (US); Glen A Oross, Corvallis, OR (US); Memphis Zhihong Yin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 324 days.

(21) Appl. No.: 09/765,841

(22) Filed: Jan. 18, 2001

(65) Prior Publication Data

US 2002/0093608 A1 Jul. 18, 2002

(51) Int. Cl.[7] .............................................. G02F 1/1335

(52) U.S. Cl. ....................................................... 349/114

(58) Field of Search .................................. 349/113, 114

(56) References Cited

U.S. PATENT DOCUMENTS

| | | | | | |
|---|---|---|---|---|---|
| 4,398,805 | A | * | 8/1983 | Cole | 349/68 |
| 4,448,823 | A | * | 5/1984 | Clifford | 428/1.31 |
| 6,385,139 | B1 | * | 5/2002 | Arikawa et al. | 368/239 |
| 6,496,287 | B1 | * | 12/2002 | Seiberle et al. | 359/15 |
| 6,498,633 | B1 | * | 12/2002 | Ozeki et al. | 349/96 |

* cited by examiner

*Primary Examiner*—Toan Ton

(57) ABSTRACT

A backlit label includes a transparent element and a transflective element positioned at the backside of the transparent element. The transparent element passes light bi-directionally, whereas the transflective element passes light received from a first direction and reflects light received from an opposite direction. A backlight source, which may or may not be integrated with the label, produces backlighting for the label. The transflective element passes the backlight that emanates from behind out through the transparent element. However, for ambient light received from in front of the label, the transflective element reflects the ambient light back out through the transparent element.

15 Claims, 3 Drawing Sheets

BACKLIT LABEL WITH ENHANCED "OFF"STATE APPEARANCE

TECHNICAL FIELD

This invention relates to product labels, and more particularly, to backlit labels.

BACKGROUND

Labels are used today on products to present important information, such as a company logo, an instruction, or a warning. One type of label used in electronic products is a "backlit" label, in which a light source is positioned behind the label to make the background brighter and characters in the label appear sharper.

The backlighting can be derived from many different sources. In one case, the source may be specifically dedicated to the label. For instance, a flat light, such as an electroluminiscent (EL) light, may be integrated into an electronic label to specifically light the label when power is applied. Alternatively, the backlight may be derived from a source separate from the label. Light from an LCD (liquid crystal display) screen, for example, may be redirected as a backlight onto a passive label. The Apple Powerbook notebook computer employs this technique by arranging a passive logo on the backside of the LCD and piping light leaked from the LCD backlight onto the logo to illuminate the logo.

Conventional backlit labels are plagued by an appearance problem in that one state, either "on" or "off", does not look nearly as good as the other state. Typically, backlit labels look good in the "on" state, but not in the "off" state. Rather, when "off", the backlit label appears as if it is simply turned off, often looking worse than a passive label.

One complicating factor is that the backlight should be bright enough to be visible in a high ambient light environment. In dual-mode products such as wristwatches, designers assume that the backlit state will be used only in dim environments. As a result, the light does not have to be very bright and the "off" state appearance is less important because it cannot be seen.

Accordingly, there is a need for a backlit label that is visually appealing in both the "on" and "off" states, as well as in both light and dark environments.

SUMMARY

A backlit label includes a transparent element and a transflective element positioned at the backside of the transparent element. The transparent element passes light bi-directionally, whereas the transflective element passes light received from a first direction and reflects light received from an opposite direction. A backlight source, which may or may not be integrated with the label, produces backlighting for the label. The transflective element passes the backlight that emanates from behind the label out through the transparent element. However, for ambient light received from in front of the label, the transflective element reflects the ambient light back out through the transparent element. As a result, the label is visually appealing in both the "on" and "off" states and exhibits distinctly different looks in the two states. Moreover, the label performs well in both light and dark environments.

BRIEF DESCRIPTION OF THE DRAWINGS

The same numbers are used throughout the drawings to reference like features and components.

DETAILED DESCRIPTION

The following discussion is directed to a backlit label that is designed to be visually appealing in both the "on" and "off" states. Additionally, the backlit label is constructed to look different in each state, creating an interesting image in both light and dark environments.

The backlit label is described in the context of an electronic device, such as a notebook computer. However, the backlit label may be used with any number of products. Other potential products include portable electronic devices, mobile communications devices, office equipment, consumer appliances, and so on.

Figure 1:
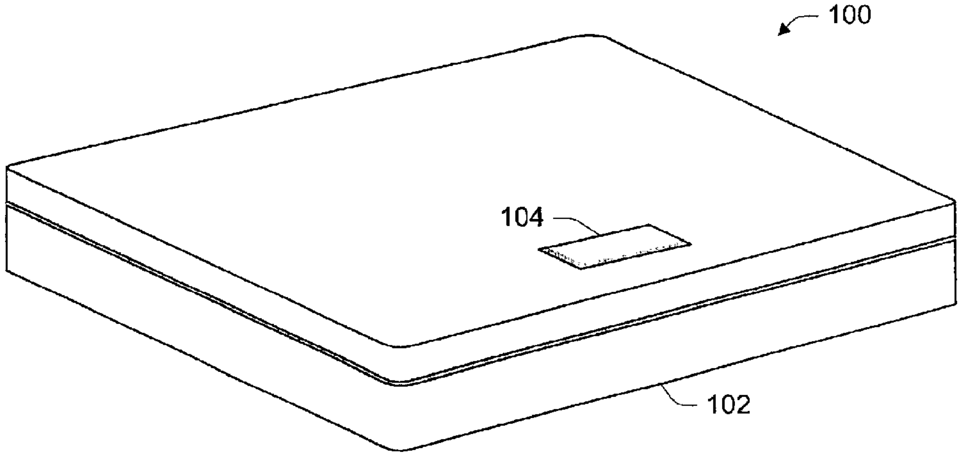
FIG. 1 shows a notebook computer with a backlit label.

FIG. 1 shows a notebook computer 100 having a housing 102 and a label 104 mounted on the exterior of the housing 102. The label 104 is a backlit label that can be selectively illuminated when backlighting is directed onto the label from behind. In this manner, the label has an "on" state when backlighting is applied and an "off" state when backlighting is absent.

Figure 2:
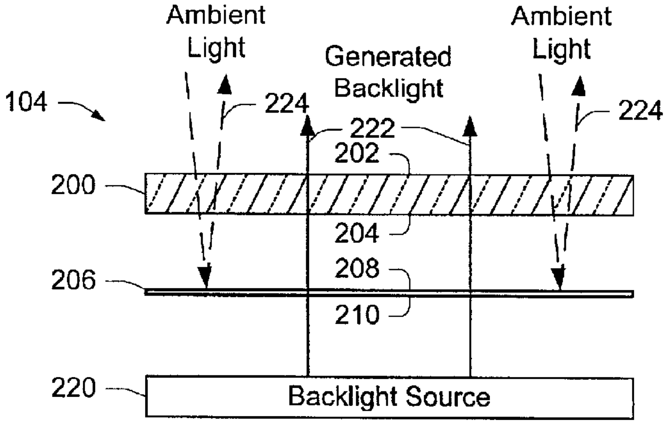
FIG. 2 shows an exploded side view of a backlit label.

FIG. 2 shows the backlit label 104 in more detail. The label 104 includes a transparent element 200 formed of a light transmissive material (e.g., plastic) that passes light bi-directionally. For purposes of orientation, the transparent element 200 has a face or front side 202 and a rear or backside 204.

The label 104 also includes a transflective element 206 positioned adjacent to, and behind, the transparent element 200. The transflective element 206 has a front surface 208 that is juxtaposed with the backside 204 of the transparent element 200 and a rear or back surface 210.

The transflective element 206 is formed of a material that passes light uni-directionally so that light emanating from one side of the element 206 (e.g., backlight from the back surface 210) is passed through while light emanating from an opposing side of the element (e.g., ambient light on the front surface 208) is reflected. As one example implementation, the transflective element 206 is a metallic transflective film that is coated, adhered, mounted, or otherwise positioned next to the backside 204 of the transparent element 200.

The label 104 may include label data, such as a logo, a warning, an instruction, and the like. The label data may be created in many ways and positioned in a variety of places on the label. As one example, the label data is printed on the backside 204 of the transparent element 200. Alternatively, the data may be imprinted, textured, or otherwise formed as part of the transparent element 200. Another option may be to print label data onto the transflective element 206.

The label 104 may also be partially or fully colored. The selected color will provide the color tones of the label when illuminated by the backlight.

A backlight source 220 generates backlighting for the label. The backlight source 220 may be integrated as part of the label, or it may be separate from the label. In one implementation, the backlight source 220 is a flat light, or more specifically, an electroluminiscent (EL) light that is positioned adjacent the back surface 210 of the transflective element 206.

The backlight emanated from the backlight source 220 passes through the transflective element 206 and out through the transparent element 200, as indicated by arrows 222. Additionally, ambient light received from the front side of the transparent element 200 pass through the transparent element 200 and reflects off the transflective element 206 back out through the transparent element 200. This reflected ambient light is depicted as arrows 224.

A small percentage of ambient light may pass through the transflective element 206. If a backlight source is integrated into the label (e.g., an EL light), the ambient light may also reflect off the backlight source back through the transflective element 206 and transparent element 200.

The label 104 presents two different visual appearances in its "on" and "off" states. Due in part to the properties of the transflective element 206 and in part to the characteristics and coloring of the transparent element 200, the label 104 looks distinctively different when illuminated by backlighting that penetrates through the transflective element 206 from the backlight source 220, as compared to when illuminated by ambient light that is reflected from the transflective element 206.

Additionally, unlike conventional backlit labels, the label is visually appealing in both light and dark environments. In a dark environment, the label stands out with the backlight. In a light environment, the label 104 has a reflective quality that is more akin to a properly designed passive label than a backlit label that is temporarily un-illuminated in the "off" state.

Figure 3:
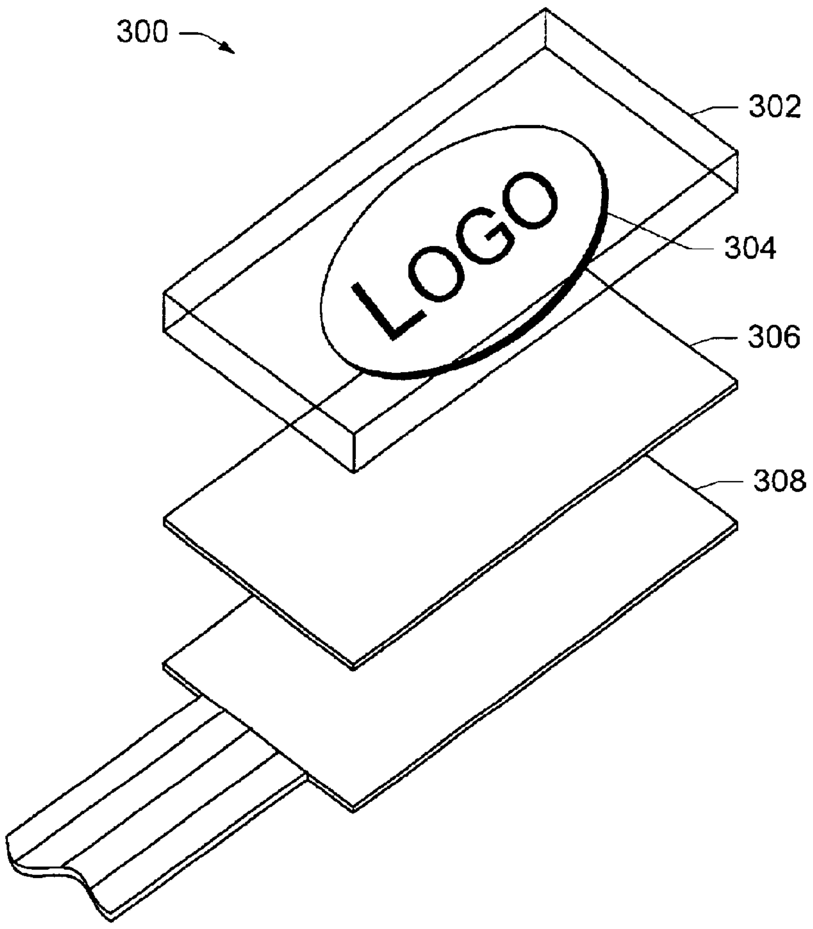
FIG. 3 shows an exploded perspective view of a backlit label with an integrated backlight source.

FIG. 3 shows an exemplary implementation of a label 300 to illustrate how two distinctive and visually appealing looks may be achieved. The label 300 has a clear transparent element 302 with label data, in the form of a logo 304, printed on the backside. The logo 304 is printed in a blue color tone. A metallic transflective film 306 is juxtaposed to the backside of the transparent element 302. An EL backlight 308 is positioned adjacent the metallic transflective film 306 to form a backlit label with an integrated backlight source. In this arrangement, the transflective film 306 is interposed between the transparent element 302 and the backlight 308.

In the "on" state, the EL backlight 308 generates a backlight that passes through the metallic transflective film 306. The majority of visible light emanating from the label 300 is due to the backlight, and not the ambient light that is being reflected. As a result, the label 300 exhibits a deep blue color imparted on the backlighting by the blue-tinted logo printing on transparent element 302. It is noted that other printed colors will yield different illuminated color tones.

When the label is "off" and no backlight is present, the label 300 predominately reflects ambient light from the metallic transflective film 306. As a result, the label 300 yields a metallic silver color.

In this implementation, the "off" and "on" states are distinctly different looking. Moreover, both the silver color (i.e., the "off" state) and the deep blue color (i.e., the "on" state) are visually appealing. That is, unlike conventional backlit labels, the silver color exhibited by the un-illuminated label 300 does not resemble a backlit label currently in an "off" state (which one might expect to be some shade of blue, for instance), but instead is more akin to the look of a passive label.

Figure 4:
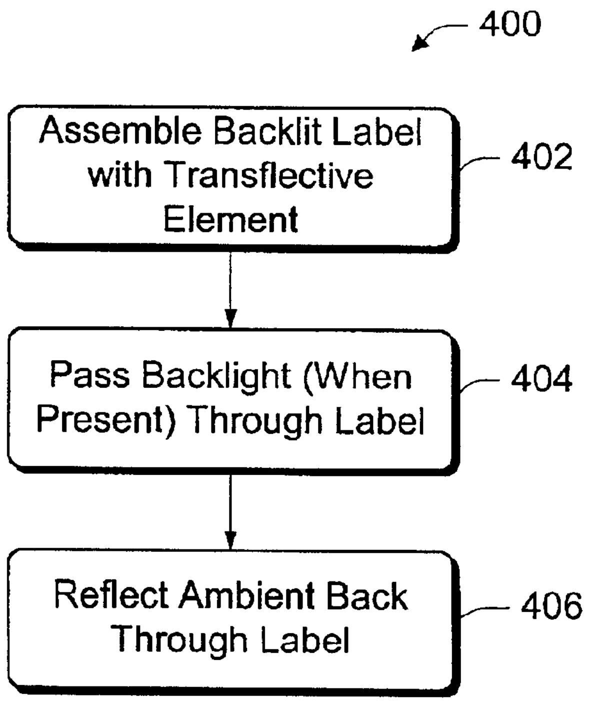
FIG. 4 is a flow diagram of a method for operating a backlit label.

A product that is equipped with the label assembly thus implements a methodology for presenting a label that is visually appealing in "on" and "off" states, as well as light and dark environments. FIG. 4 illustrates the methodology 400. At block 402, a backlit label is assembled by layering a transflective element between a backlight source and a transparent element. Once assembled, a backlight (when present) emanating from behind the label is passed out through the transparent label (block 404). Additionally, ambient light received from in front of the label is reflected back through the label (block 406).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. A label comprising:

a transparent element to pass ambient light and backlight; and a transflective element directly disposed to the transparent element to pass the backlight, but reflect the ambient light;

wherein the transparent element includes label data and the label data is visible both with and without applying power to the label.

2. A system as recited in claim 1, wherein the transflective element comprises a metallic transflective film.

3. A system as recited in claim 1, further comprising an electroluminiscent light to produce the backlight.

4. An electronic device comprising the label as recited in claim 1.

5. A label comprising:

a light transmissive element;

a light generating element to provide backlight for the light transmissive element; and a transflective element directly disposed between the light generating element and the light-transmissive element to pass backlight generated by the light generating element out through the light transmissive element, but reflect ambient light passed in through the light transmissive element back out through the light transmissive element;

wherein the light transmissive element comprises data printed thereon; and wherein the printed data is visible both with and without applying power to the label.

6. A system as recited in claim 5, wherein the light generating element comprises an electroluminescent light.

7. A system as recited in claim 5, wherein the transflective element comprises a metallic transflective film.

8. A system as recited in claim 5, wherein the label exhibits visually different appearances depending upon whether the light transmissive element is illuminated by the backlight or the ambient light.

9. A system as recited in claim 5, wherein the label exhibits a first color when the light transmissive element is illuminated by the backlight and a second color when the light transmissive element is illuminated by the ambient light.

10. An electronic device comprising the label as recited in claim 5.

11. An assembly comprising:

a backlight source to generate a backlight; and a label that reflects ambient light and emanates the backlight when the backlight is generated, wherein the label comprises:

a transparent element; and a transflective element directly disposed to the transparent element to pass the backlight, but reflect the ambient light;

wherein the transparent element includes label data and the label data are visible both with and without applying power to the label.

12. An assembly as recited in claim 11, wherein the backlight source comprises an electroluminescent light.

13. An assembly as recited in claim 11, wherein the backlight source is separate from the label.

14. An electronic device comprising the assembly as recited in claim 13.

15. A method comprising:

passing backlight emanating from behind a label out through the label; and reflecting ambient light received from in front of the label back through the label, wherein the label comprises:

a transparent element; and a transflective element directly disposed to the transparent element to pass the backlight, but reflect the ambient light;

wherein the transparent element includes label data and the label data is visible both with and without applying power to the label.

* * * * *